(12) United States Patent
Sarrut et al.

(10) Patent No.: US 8,992,755 B2
(45) Date of Patent: Mar. 31, 2015

(54) MICRODEVICE AND METHOD FOR SEPARATING AN EMULSION

(75) Inventors: Nicolas Sarrut, Seyssinet (FR); Hubert Jeanson, Saint Martin d'uriage (FR)

(73) Assignee: Commissariat a l'Energie Atomique, Paris (FR)

( * ) Notice: Subject to any disclaimer, the term of this patent is extended or adjusted under 35 U.S.C. 154(b) by 1929 days.

(21) Appl. No.: 11/597,364

(22) PCT Filed: Jun. 1, 2005

(86) PCT No.: PCT/FR2005/050404
§ 371 (c)(1),
(2), (4) Date: Nov. 22, 2006

(87) PCT Pub. No.: WO2005/123257
PCT Pub. Date: Dec. 29, 2005

(65) Prior Publication Data
US 2007/0227888 A1 Oct. 4, 2007

(30) Foreign Application Priority Data

Jun. 2, 2004 (FR) ...................................... 04 51089

(51) Int. Cl.
*B01D 17/06* (2006.01)
*B01D 17/04* (2006.01)
*B03C 11/00* (2006.01)

(52) U.S. Cl.
CPC .............. *B01D 17/06* (2013.01); *B01D 17/045* (2013.01); *B03C 11/00* (2013.01); *B03C 2201/02* (2013.01)
USPC ............................. 204/573; 204/564; 204/287

(58) Field of Classification Search
CPC ............. B01F 13/0071; B01F 13/0076; B01F 3/502792; B01F 13/0084; G01N 15/14; G02B 26/005
USPC .................. 422/129, 187, 224; 366/339, 338; 210/511; 204/422, 287, 556, 573, 564, 204/565
See application file for complete search history.

(56) References Cited

U.S. PATENT DOCUMENTS

| | | | | |
|---|---|---|---|---|
| 4,569,575 A | * | 2/1986 | Le Pesant et al. | 359/245 |
| 4,601,834 A | | 7/1986 | Bailes et al. | |
| 5,454,472 A | | 10/1995 | Benecke et al. | |
| 5,582,701 A | * | 12/1996 | Geis et al. | 204/451 |
| 6,149,789 A | | 11/2000 | Benecke et al. | |

(Continued)

FOREIGN PATENT DOCUMENTS

| EP | 0 815 940 A2 | 1/1998 |
|---|---|---|
| WO | WO 01/89693 A1 | 11/2001 |

OTHER PUBLICATIONS

Eow et al., Colloids and Surfaces A: Physiochem. Eng. Aspects 2003 253-279.*

(Continued)

*Primary Examiner* — J. Christopher Ball
(74) *Attorney, Agent, or Firm* — Oblon, McClelland, Maier & Neustadt, L.L.P.

(57) ABSTRACT

An active method for decanting the dispersed phase in the continuous phase of an emulsion. According to the method, repulsive forces created by an electric field are used on the drops constituting the dispersed phase. The electric field scans the reservoir containing the emulsion, enabling the dispersed phase to be concentrated in a determined region of the reservoir, for the recovery and/or analysis of the emulsion. A device implements the method.

24 Claims, 5 Drawing Sheets

(56) References Cited

U.S. PATENT DOCUMENTS

| | | |
|---|---|---|
| 6,280,590 B1 | 8/2001 | Cheng et al. |
| 6,294,063 B1 | 9/2001 | Becker et al. |
| 6,492,175 B1 | 12/2002 | Müller et al. |
| 7,329,545 B2* | 2/2008 | Pamula et al. .................. 436/53 |
| 2001/0017264 A1 | 8/2001 | Klippel et al. |
| 2001/0041357 A1* | 11/2001 | Fouillet et al. ............... 435/91.1 |
| 2002/0023841 A1 | 2/2002 | Ahn et al. |
| 2002/0179448 A1 | 12/2002 | Lauks |
| 2003/0129736 A1* | 7/2003 | Mitrani ...................... 435/284.1 |
| 2004/0007377 A1* | 1/2004 | Fouillet et al. ............... 174/52.1 |
| 2006/0226576 A1* | 10/2006 | O'Brien et al. ............... 264/293 |

OTHER PUBLICATIONS

W. Ehrfeld, et al., "Fabrication of Components and Systems for Chemical and Biological Microreactors", Microreaction Technology, 1997, pp. 72-90.

Bin Zhao, et al., "Surface-Directed Liquid Flow Inside Microchannels", Science, vol. 291, Feb. 9, 2001, pp. 1023-1026.

Verena Haverkamp, et al., "The potential of micromixers for contacting of disperse liquid phases", Fresenius J Anal Chem, vol. 364, 1999, pp. 617-624.

* cited by examiner

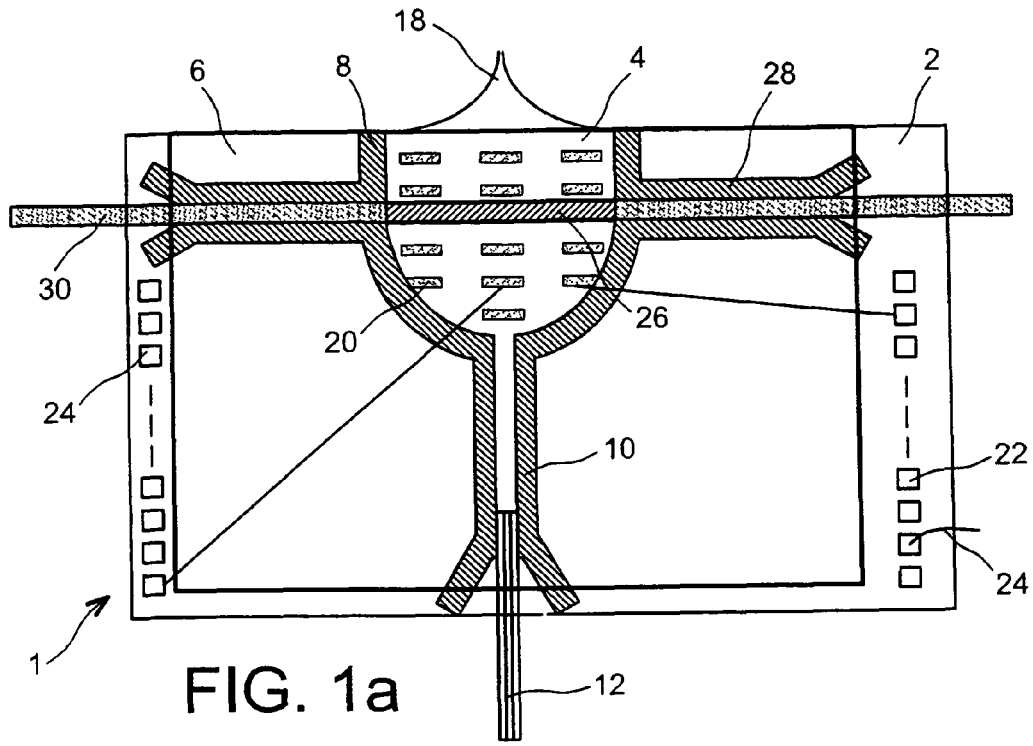
FIG. 1a
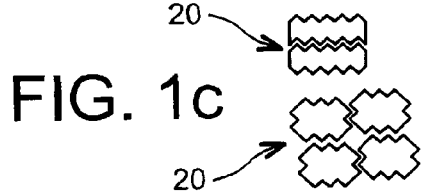
FIG. 1c
FIG. 1b
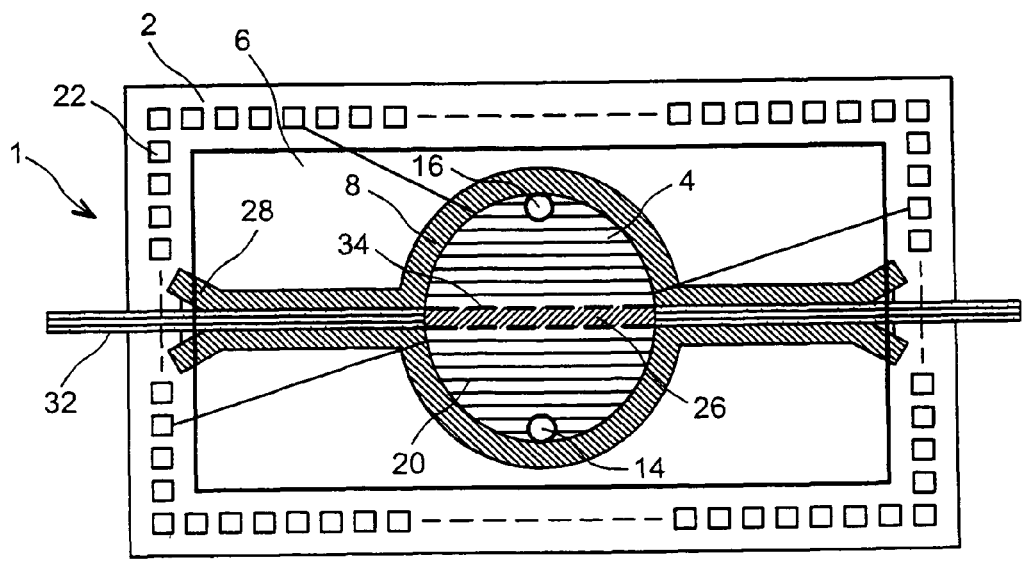

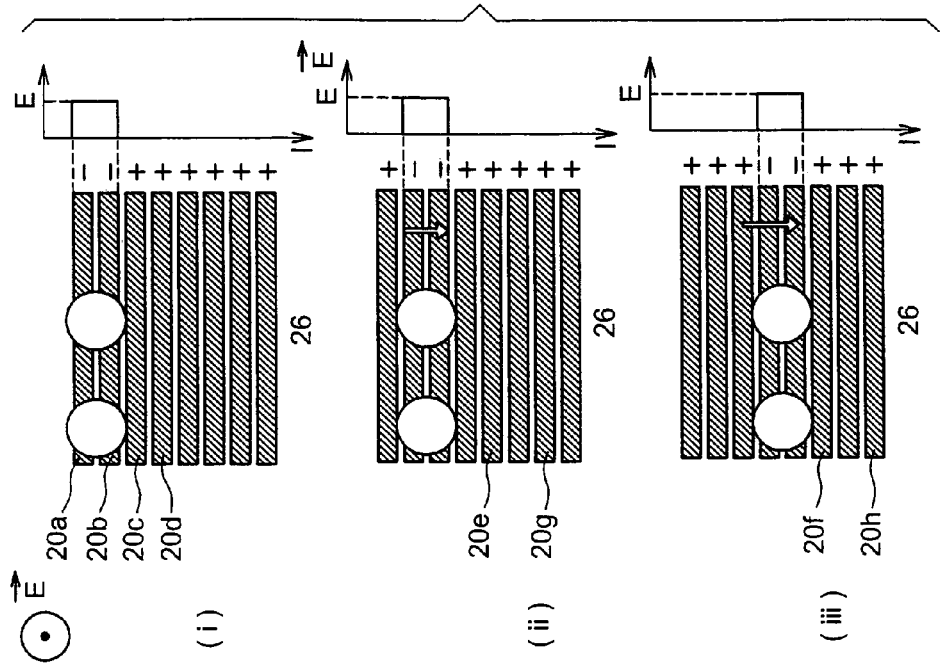
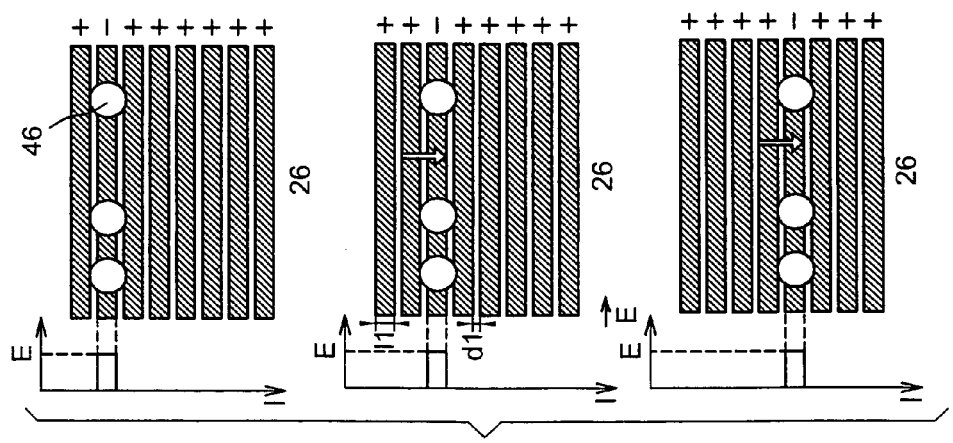
FIG. 4
FIG. 3

MICRODEVICE AND METHOD FOR SEPARATING AN EMULSION

TECHNICAL DOMAIN

This invention relates to separation of a fluid containing two immiscible phases. More particularly, the invention relates to aided settlement for minimum emulsion quantities.

The main purpose of the invention is a separation method consisting of scanning of the emulsion by an electric field, and a device adapted to this method.

STATE OF PRIOR ART

Progress in microtechnologies has led to the development of microcomponents designed to integrate biological or chemical protocols, both for experimental and commercial purposes; these components perform various functions and are known under the names "Lab-on-Chip", micro-fluidic devices, "µTAS" (Micro Total Analysis Systems), etc. Miniaturization lowers production costs for this type of device and facilitates integration of a wide variety and a large number of biological or chemical protocols to analyze, detect, produce and other functions on small quantities, sometimes at high flows and with very high efficiency.

One example relates to mass transfers in a liquid or between two fluids (liquid or gas); since the characteristic molecular diffusion time is proportional to the square of the dimensions of the system considered, miniaturization opens up interesting prospects for making and analyzing exchanges. Thus, solution micro-mixers or micro-stirrers were developed, the purpose of which was fast and efficient homogenization of chemical or biological solutions.

Furthermore, microcontactors have been developed to optimise mass transfer between two immiscible fluid phases (such as two liquid fluid phases or one liquid phase and one gas phase); the interface between two phases forms a clearly defined mass transfer area, and the ratio between the contact surface area between the different phases and the volume of the phases must be maximized to facilitate these transfers.

The devices can be used for extractions by solvent; they will then be called micro-extractors.

To take account of surface tension effects specific to multi-phase systems, a micro contactor is usually used to stabilize the different interfaces, in other words it has a number of elements to control their shape and position. In the same way as a drop of water tends to become spherical in the lack of any other interactions, interfaces of a system with two or three phases adopt a configuration that tends to minimize the global surface energy of the system. To achieve this, according to the state of the art, the location of the different liquid phases passing through micro-fluidic channels is controlled more or less by making porous walls or chemically treating some zones in these channels.

Unlike so-called stabilization methods, one approach for bringing two immiscible phases into contact and therefore for example facilitating a mass transfer is to mix and "stir" them, initially without attempting to control their location in the micro system. Thus, some authors propose devices for creating homogeneous emulsions (for example see Haverkamp et coll.: "The potential of micromixers for contacting of disperse liquid phases", Fresenius J Anal Chem 1999, 364: 617-624).

The two phases may be separated later. For example, a suitable device is proposed in document WO 01/89693, that introduces two immiscible phases separately into two different channels, makes an emulsion between them in a zone in which the channels come together, which enables transfer of the solute between the two phases with a very good theoretical efficiency, and then separate and recover the two phases.

The problem that arises with this method using a more or less homogeneous initial mix is separation of the two phases of the emulsion. Even in conventional chemistry, settlement is always a slow and an imperfect step, such that after a given and sometimes very long time, there are still some phase traces dispersed in the continuous phase, which can be a problem for some applications. This step is particularly difficult in more or less plane micro-systems, because capillarity effects are predominant due to the small dimensions of channels and reaction vessels (1-100 µm) and gravity cannot always be used. Thus, passive settlement is usually impossible.

Therefore settlement, in other words separation of the two phases of an emulsion, has to be aided.

PRESENTATION OF THE INVENTION

The invention proposes an active method, in other words with added energy, for separation of the dispersed phase and the continuous phase of an emulsion, and an adapted device for overcoming the disadvantages mentioned above.

According to one aspect of the invention, after the emulsion has been added into a plane micro-fluidic cavity, in other words for which the transverse dimension (usually along a vertical direction) is very small compared with its lateral dimensions (usually horizontal), it is scanned with an electric field that moves the drops of the dispersed phase laterally, thus separating it from the continuous phase.

When an electric field is applied to the drops of a dispersed phase, they can be subjected to a repulsive force and thus find themselves at equilibrium in levitation; this is particularly advantageous when the electric field is transverse (vertical). If the plane cell containing the emulsion is also scanned by the electric field, the drops are displaced parallel to the plane of the separation cell, perpendicular to the direction of the electric field if the direction of the electric field remains constant, and are concentrated in a so called collection zone.

Therefore according to one of its aspects, the invention relates to a method for separation of an emulsion containing a dispersed phase in a continuous phase. The reservoir containing the solution is scanned by an electric field to a collection zone in which the dispersed phase concentrates. Advantageously, application of another predetermined repulsive force in the collection zone coalesces the concentrated dispersed phase.

Preferably, the electric field is created by selective and sequential activation of pairs of electrodes located on two opposite faces of the reservoir in which the emulsion to be separated is located. For example, scanning with an electric field is done using a network of electrodes covering one of the two inner faces of the reservoir and at least one counter electrode covering the opposite face, these faces preferably being the lateral faces (horizontal during conventional use). The electric field perpendicular to these two faces is moved parallel to the faces, selectively and successively activating one or several given electrodes, in other words by applying a potential different from the potential of the counter electrode.

The scanning speed depends on the nature of the emulsion and the size of the reservoir.

Another purpose of the invention is to propose a device adapted to such a separation method. The device according to the invention comprises a reservoir for the emulsion in which two opposite walls comprise electrode networks, advantageously over the entire surface of the reservoir. In one preferred form, the electrodes on one of the walls are parallel tracks and/or the other network is composed of a single electrode. The device is preferably practically plane, with opposite surfaces at a distance of 10 μm to 500 μm, particularly 100 μm to 300 μm and may be integrated into any existing microsystem.

The electrodes of the device according to the invention may be activated selectively in pairs so as to create an electric field passing through the reservoir and located in the part of the volume defined by the space between the pairs of activated electrodes. This electric field moves with respect to the walls of the device, towards a so-called collection zone by successive activation of pairs of electrodes; advantageously, at any instant the electric field is perpendicular to the opposite walls. Therefore the dispersed phase of the emulsion can follow the displacement of the electric field and condense at a collection zone in the reservoir. The device according to the invention is connected to means for selective activation of the electrodes.

Advantageously, the reservoir collection zone is delimited physically by porous walls and/or chemically by a local treatment of at least one of its walls in order to obtain a preferred wettability of the dispersed phase.

Means may be located at the collection zone, for example so as to recover the dispersed phase that is concentrated at this location and/or to analyze it.

BRIEF DESCRIPTION OF THE DRAWINGS

The appended figures are useful for a better understanding of the invention, but are only given for information and are in no way restrictive.

FIGS. 1a, 1b and 1c show examples embodiments of a device according to the invention.

FIGS. 3 and 4 diagrammatically show the displacement of drops dispersed within the continuous phase while the electric field is scanning.

DETAILED PRESENTATION OF PARTICULAR EMBODIMENTS

Figure 2A:
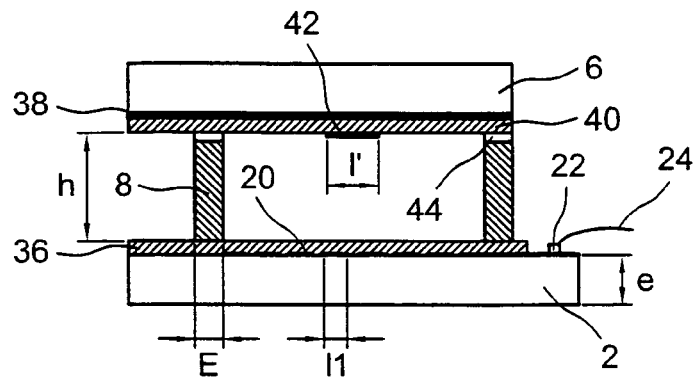
FIGS. 2a, 2b, 2c present an embodiment of a device according to the invention.

An emulsion between two fluids is composed of a dispersed phase within a continuous phase; the dispersed phase is conventionally in the form of spherical drops of one of the fluids.

Conventionally and as described in the literature, the expression of the dielectric force applied to a dielectric sphere immersed in a medium and subjected to a uniform electric field is given by $$\langle F(t) \rangle = 2\pi \epsilon_0 \epsilon_m r^3 Re[f_{CM}] \nabla(\sqrt{\langle E \rangle})^2 \text{ where}$$

$\epsilon_0, \epsilon_m, \epsilon_p$: dielectric constants for a vacuum, the medium and the material forming the spherical particle;
$f_{CM} = (\epsilon_p^* - \epsilon_m^*)/(\epsilon_p^* + 2\epsilon_m^*)$ Clausius-Mossoti factor, where $\epsilon_p^*$ and $\epsilon_m^*$ ($\epsilon_{p,m}^* = \epsilon_{p,m} - j\sigma/(\epsilon_0 \omega)$) are complex permittivities of the spherical particle and the medium, σ is the conductivity and ω is the angular frequency,
$Re[f_{CM}]$: real part of the Clausius-Mossoti factor,
$\langle E \rangle$: average value of the electric field.

Thus, if $Re[f_{CM}]>0$, the spherical particle is subject to a positive so-called levitation force. At high frequency ($\omega \rightarrow \infty$), the complex permittivity tends towards the dielectric constant ($\epsilon_{p,m}^* \rightarrow \epsilon_{p,m}$).

Therefore, if $\omega \rightarrow \infty$, $Re[f_{CM}]>0 \Leftrightarrow \epsilon_p > \epsilon_m$; when working at high frequency and if the dispersed phase is composed of a material that can be polarized with a permittivity greater than the permittivity of the medium, the drops of this dispersed phase can be displaced by applying a repulsive force to put them in levitation. This condition is actually satisfied in oil or hydrocarbon (dodecane) type emulsion systems in an aqueous phase.

Furthermore, if an electrical field scan E is also applied, the drops in levitation follow the field and therefore, if the electric field E remains in the same direction while being displaced orthogonally to this first direction, the drops are displaced along a second direction perpendicular to the first direction of the field. Therefore, the dispersed phase is concentrated by displacement of the drops making up the dispersed phase within the continuous phase.

The invention proposes to use this principle for active separation of a dispersed phase within a continuous phase, advantageously within the framework of the microsystem.

To achieve this, an emulsion separation device was developed, for example as shown in FIGS. 1a and 1b, in which it is shown in a top view. The terms "vertical", "horizontal", "lower" and "upper" refer to conventional use of the device according to the invention; these concepts are relative and are in no way limitative, and will be used so as not to unnecessarily complicate the description.

The separation device 1 or the settlement device is arranged on a support 2 in the case of a micro-system. It comprises a reservoir or an emulsion chamber 4 that will contain the solution composed of at least a dispersed phase dispersed in a continuous phase. The emulsion chamber 4 is delimited by a lower wall (consisting of the support 2 in the box shown) on a first surface, by an upper wall output from a cover 6 of the device 1 on a second surface, and by sidewalls 8. The shape of each of the first and second surfaces may be arbitrary, but advantageously the two surfaces are superposed.

The emulsion reservoir 4 is provided with an emulsion inlet orifice. As shown in FIG. 1a, it may be a horizontal input channel 10 that may for example be coupled with a capillary 12. An input along the transverse direction through the cover 6 may also be provided; FIG. 1b thus has an access orifice 14 located on the upper wall of the reservoir 4, in which for example a pipette can be placed for injection. Advantageously, the reservoir 4 is also provided with a vent 16 that facilitates its filling. Depending on how the device 1 is used, an output channel 18 may also be provided for the continuous phase of the emulsion; the output channel 18 may be very wide (for example 1 mm), because it may form an output to a bin. Furthermore, at the end of the method, the liquid phase may be evacuated through the edge of the component.

Obviously the two embodiments are illustrative, and any combination between these various elements, and different geometries and positions are possible.

A network of first electrodes 20 covers the first wall of the reservoir, in other words the surface defined by the network 20 contains the first surface of the emulsion chamber 4. As shown, the first electrodes 20 may have different shapes. Preferably, they are composed of longitudinal parallel tracks passing through the reservoir 4 as shown in FIG. 1b. Advantageously, the electrodes 20 are nested to each other, for example by a sawtooth profile like that shown diagrammatically in FIG. 1c, regardless of the "checker board" (FIG. 1a), parallel (FIG. 1b) or other configuration.

Furthermore, a network of second electrodes is located on the cover 6 of the device at the second surface. Advantageously, a single second electrode, or counter electrode (see FIG. 2a), covers all or part of the second surface of the emulsion reservoir 4.

Each electrode in the network 20 is electrically connected through an integrated track to a connection contact 22 that is accessible from the outside through a wire 24 and for example is located on the support 2, for example by welding gold wires.

During the displacement and during the settlement method as described below, the dispersed phase drops of the emulsion accumulate in a zone in the emulsion chamber 4 called the collection zone 26; this collection zone 26 is parallel to the direction of the electrodes in the case in which they are longitudinal electrodes of the network 20. In general, given the scanning of the electric field, the zone 26 in which the drops are accumulated has a narrow longitudinal surface on the upper wall 6 and lower wall 2, and pass through the reservoir 4 from one side to the other.

Advantageously, the surface at the collection zone 26 of at least one of the first or second walls 2, 6 has been treated to enable the dispersed phase to wet this wall at this location in preference to the continuous phase, and thus to be fixed in the collection zone 26.

Two guide entities 28 facing the collection zone 26 and on the sidewalls 8, are each provided with a flared inlet so as to facilitate the insertion of components.

For example it would be possible to insert or even to glue optical fibers 30 connected to an optical detection device such as a spectrophotometer, in the guide entities 28. Thus, the optical fibers 30 enable a reading of the absorbance of the liquid present in the collection zone 26, so that it can be analyzed, at any time. An integrated reading system could thus be used for electrical detection.

If it is required to collect the dispersed phase, capillaries 32 could be placed in the guides 28 instead of or in addition to the optical fibers 30. Once the dispersed phase has been collected in the collection zone 26 according to the method described later, an overpressure applied to either of the inputs of capillaries 32 is used to transport the collected phase to the other capillary, and thus to recover it at the output. For example, the collected phase will be pushed by injecting air into one of the two capillaries.

Stabilization means for two-phase flow along the collection zone 26, for example a porous wall 34, can facilitate the recuperation method by guiding the collected dispersed phase along a preferred direction. The other stabilization elements presented in the literature could also be used, for example a groove of the support 2 at the collection zone 26.

Advantageously, the entire fluidic structure has a two-dimensional geometry, in other words the thickness of the reservoir 4, the input 10 if any, and the guide channels 28 (namely the height of the walls 8, 34) is much less than the dimensions of the device 1 in a plane parallel to the first or the second wall, for example a height h (see FIG. 2a) of the walls equal to 10 μm to 500 μm, for a surface area of the reservoir 4 on the first and/or the second walls of the order of one mm$^2$ or one cm$^2$.

Note that the devices presented and their alternatives, for example derived by making different combinations between the elements described above, may be integrated into or assembled to any existing micro-system, particularly to any emulsion "production" device as known in prior art (for example see Haverkamp et coll., Fresenius J Anal Chem 1999, 364: 617-624). Thus, firstly the liquid/liquid extraction between the dispersed phase and the continuous phase of the emulsion can be done efficiently, and then one or both phases can then be recovered or analyzed by means of the separation device 1 according to the invention.

Figure 2B:
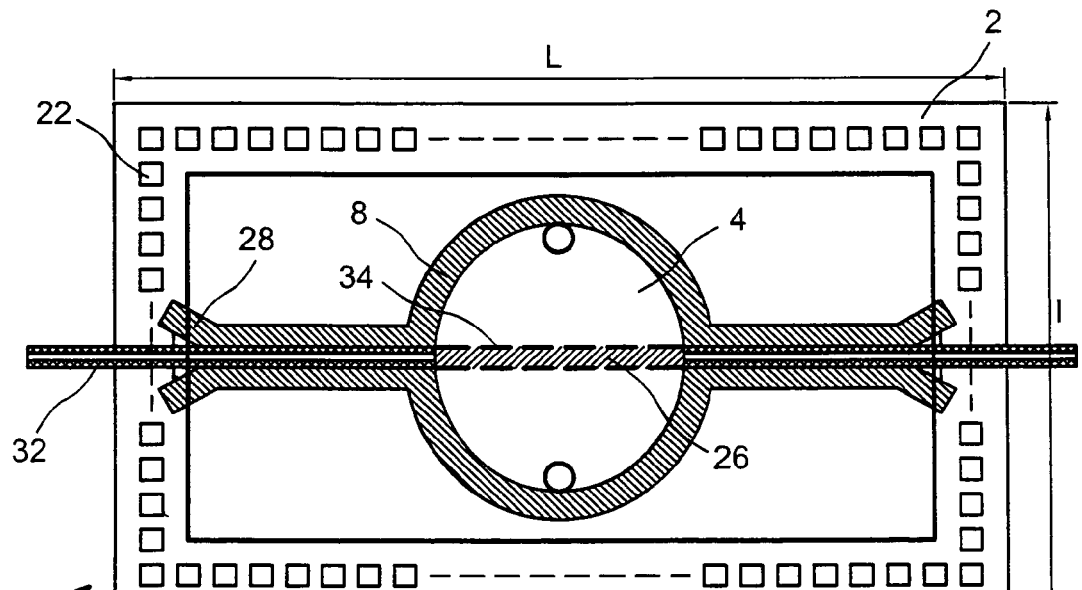
Figure 2C:
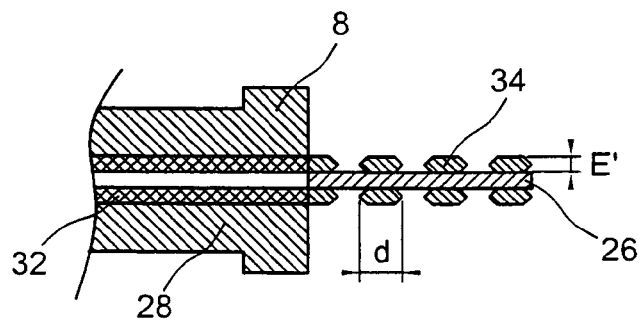

A device according to the invention may be made using any known method. Advantageously, conventional micro-electronic techniques can be used. Thus for example, as shown in FIGS. 2a-2c, the first wall or the lower wall that also includes the support 2; is made of glass or silicon; the support 2 may have a length L of the order of one centimeter, for example for a width l of a few millimeters and a thickness e of 500 μm.

A network of electrodes 20, for example made of gold, is made for example by photolithography. Advantageously, in the case of longitudinal electrodes like those shown in FIG. 1b, the length of the electrodes is such that they pass through the reservoir 4 with width $l_1$ of the order of 3 μm to 50 μm, and are separated by a distance $d_1$ less than 10 μm.

According to the corresponding conductivities of the continuous phase and the dispersed phase, it may be advantageous if the emulsion is not in contact with the electrodes. A layer of electrical insulation 36 may then be deposited on the electrodes 20 and the support 2. This step may consist of a $SiO_2$ deposit by PECVD (Plasma Enhanced Chemical Vapour Deposition), with the exposure of connection contacts 22 towards the pads by photolithography. The insulation 36 may also be a polymer, for example such as parylene deposited in the vapour phase after production of the walls 8, 34, or Teflon™ deposited by spin coating before assembly of the device 1.

The sidewalls 8 of the emulsion chamber 4 may be made of a thick resin, of the SU8™ type deposited by photolithography, as with the guide entities 28. Preferably, the reservoir 4 has a surface area of the order of one square millimeter or one square centimeter, and the thickness E of the sidewalls 8 is of the order of 50 to 300 μm. In this step, it is also possible to deposit porous walls 34 around the collection zone 26; advantageously, the thickness E' of these walls 34 is a few microns, and the pores are also separated by a distance d of a few microns; the size of the pores depends on the phases to be separated, in other words the size of the dispersed phase drops, dispersed in the continuous phase, but it may also be of the order of a few microns.

The shape of the upper wall 6 or the cover made of glass such as Pyrex™ or plastic such as polycarbonate is advantageously chosen to be similar to the support 2 but is slightly smaller to enable easy access to contact connections 22, as shown in FIG. 2. The connection contacts 22 are made in a known manner and their dimensions may be of the order of 100 to 500 μm.

Parallel to treatment of the support 2, the counter electrode 38 may also be deposited on the cover 6 by photolithography, for example made of ITO (Indium Tin Oxide). The electrical insulation 40, if any, is achieved by making a deposit of parylene, Teflon™ or $SiO_2$, etc., or even a mix. The surface 42 on this second wall of the contact zone 26 is treated, for example by a fluoride compound such as polytetrafluoroethylene (or Teflon™) deposited in the vapour or liquid phase and located by photolithography; this treatment enables preferential wetting of the dispersed phase during separation.

According to the disclosed embodiment, the contact zone 26 passes through the reservoir 4 with a diameter and a width l' of about ten up to about a few hundred microns.

The substrate 2 and the cover 6 are then assembled, for example by a glue silk screen 44 at the walls 8, to form a device 1 according to the invention.

Note that the treated surface 42 may be located on the first wall 2, or even on the two supports 2 and the cover 6. Similarly, the sidewalls 8 and/or porous walls 34 can be made on the cover 6 when the cover is being formed.

Then, depending on the use, collection capillaries 32 may be inserted in the guide entities 28, and their diameter may be of the order of 10 to 500 µm. They may be glued into the guide walls 28 after insertion, advantageously formed at the same time as the sidewalls 8 of the collection chamber 4.

Connection contacts 22 are then connected to means of selectively activating the electrodes 20, 38, particularly through the wires 24. Advantageously, the counter electrode 38 on the cover 6 is brought to a potential, and means (not shown) activate the first electrodes 20 sequentially by applying a different potential to them, which creates an electric field E oriented along the direction of the height and that moves perpendicular to the first electrodes. Preferably, the potential is applied sequentially to adjacent electrodes, so as to have a scanning effect by the electrical field E.

One example of a sequential application for scanning is given in FIGS. 3 and 4. Diagrammatically, eight first parallel electrodes 20a-20h are shown, between a first electrode 20a far from and a first electrode 20g close to the collection zone 26. The second electrodes (not shown; in this case in a parallel plane above the plane of the paper) are at a positive potential; therefore the electric field E is in the up direction above the plane of the paper. The electric field E is made such that it remains perpendicular to the paper (in other words for example the second electrodes covers the entire surface of the electrodes 20a-20g, or there are eight second electrodes configured in the same way as the first electrodes). Obviously, these restrictions are illustrative and are given to not unnecessarily complicate the explanations given below.

Thus, according to FIG. 3, if a first electrode 20b is brought to a negative potential during step (i), the emulsion drops 46 affected by the dielectrophoretic forces created by the electric field E, are located at this electrode 20b. The next step is to deactivate the electrode 20b to activate the next electrode 20c; step (ii). Therefore the electric field E is moved slightly downwards in the context of the figure, and the drop 46 tends to move towards the activated electrode 20c. This procedure is repeated by deactivating and activating the first adjacent electrodes; note that in step (iii), during scanning by the electric field E, the drop 46 moves as far as the electrode 20e in the direction of the collection zone 26.

FIG. 3 shows scanning by the electric field E by successively activating the electrodes 20 in the direction towards a collection zone 26. However, the displacement of the electric field E and the number of simultaneously activated electrodes can be modulated, particularly to take account of the size of the drops 46 in the emulsion.

Considering the first electrodes 20 with width $l_1$, typically between a few microns and a few tens of microns, separated by a distance $d_1$ of a few microns, they can be activated in sequence one after the other to carry drops with diameter $l_1+\Delta l<2l_1$. The electrodes can be activated in pairs as shown in FIG. 4 to displace larger drops, for example with diameter $2l_1+\Delta l$. The electrodes will be activated n to n for drops with diameter $nl_1+\Delta l$, etc.

The procedure described in FIGS. 3 and 4 may be repeated; once the final electrode 20g, in other words the electrode or pair of electrodes located more or less at the collection zone 26, has been activated, the initial electrode 20a can be activated again. Depending on the strength of the electric field E, the distance separating the start and end electrodes, the scanning rate and the surface treatment 42 at the collection zone 26, the drops 46 concentrated at the collection zone 26 will remain there, or will only move slightly. In any case, the concentration gradient of the dispersed phase 46 within the continuous phase is greater than the initial gradient, and it increases as the scanning continues.

To avoid excessive redistribution of drops when the "far" electric field returns in the collection zone 26, one or several electrodes located under the collection zone 26 can be activated permanently, and an intense repulsive force can be produced in them, for example to collect all drops towards the same wall of the collection zone 26.

Depending on the geometry of the emulsion chamber 4 and particularly the location of the collection zone 26, the first electrodes 20 can be activated symmetrically about the collection zone. Thus for example, the separation method shown in FIG. 5 will be possible for a device similar to that shown in FIG. 1b.

Figure 5A:
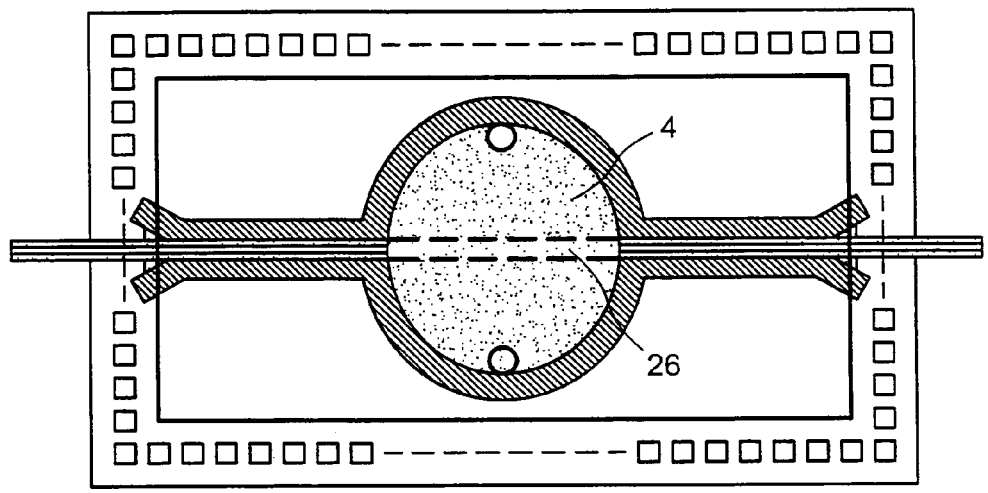
FIGS. 5a, 5b, 5c show an example embodiment of the method according to the invention.

Firstly, the reservoir 4 is full of a homogeneous emulsion, in other words the second phase is uniformly dispersed in the first continuous phase in the form of drops: FIG. 5a.

Figure 5B:
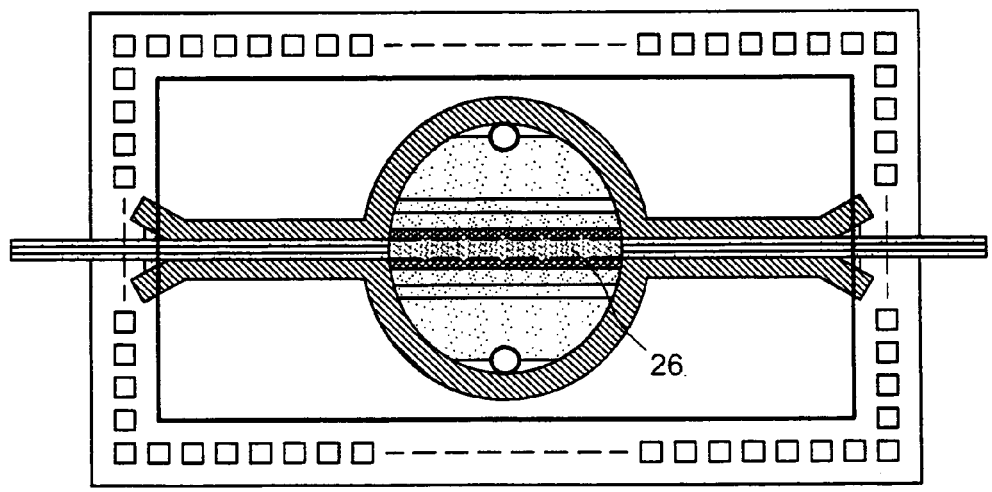

By activating the electrodes as described above, the dispersed phase concentrates at the collection zone 26, in this case forming a diameter of the reservoir 4, as shown in FIG. 5b. Once the drops 46 of the dispersed phase have been displaced in the collection zone 26, a large repulsive force can be applied to the drops for example by an electric field E with a higher amplitude or a longer duration, to encourage their wetting firstly with the chemically treated wall 42, and secondly between the different drops 46 themselves; thus, coalescence of the drops is possible to obtain a second continuous phase, immiscible with the first continuous phase of the emulsion. By applying a pressure on the drops 46 for a sufficiently long period, the interface film between the drops "escapes" and the drops coalesce.

At the end of the protocol, the collection zone 26 is completely full of the second phase preferably made continuous. Furthermore, the second initially dispersed phase is practically all in the collection zone 26; depending on the ratio of the initial volume of the dispersed phase to the collection volume, it is possible that there are no drops 46 remaining in the first continuous phase.

Figure 5C:
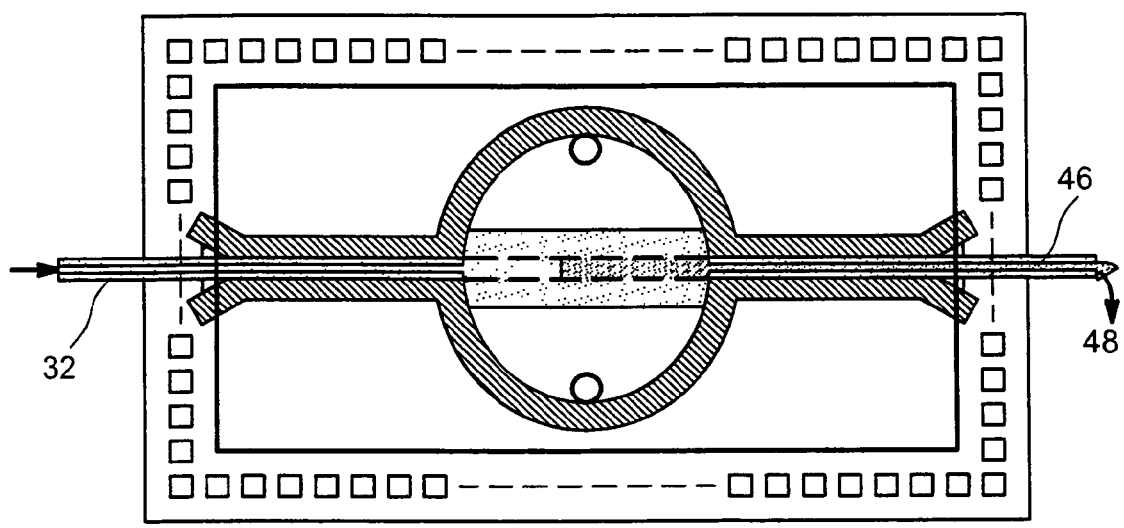

The second phase, in other words the initially dispersed phase, can be recovered for example by injection of a fluid under pressure through the first capillary 32: FIG. 5c. The fluid will move the drops 46, or the phase composed of the drops, towards the second capillary and towards a collection reservoir 48, particularly in the case in which the porous walls 34 assist guidance. As is described above, it is also possible to form an in situ analysis of this phase.

For example, a 5-20 µm emulsion (diameter of the drops) of dodecane in an aqueous solution can be separated; in this case, the surface treatment of the collection zone 26 may be a fluoride compound deposited in the vapour or liquid phase. The dodecane emulsion is injected into a separation chamber with a height h-100 µm provided with 20 µm electrodes with width $l_1$. The imposed electric fields E are of the order of 100-1000 V/cm at a frequency of 0.1 to 1 MHz. The drop displacement velocity is of the order of 20 µm/s.

The invention may be applied to any biology or chemistry micro laboratory performing extraction by solvent. Such extractions may be used to analyze liquids (for example water) and particularly to detect some chemical species present in trace form. After a first step to extract one or several chemical species of the continuous phase of an emulsion to its condensed phase, the two phases can be quickly separated for analysis if required, or for a chemical retreatment of one or both phases.

The invention claimed is:

1. A separation device for an emulsion containing a dispersed phase dispersed in a first continuous phase, comprising:

an emulsion reservoir delimited between a first wall and a second wall facing the first wall, the reservoir having a first surface on the first wall;

a plurality of first electrodes, fixed to the first wall at the first surface of the emulsion reservoir;

at least one second electrode fixed to the second wall;

a collection zone included in the reservoir, delimited by parts of the first wall and the second wall that are included in the surfaces defined by the plurality of first electrodes and the at least one second electrode respectively, the collection zone including porous walls delimiting sides thereof;

means for selectively activating pairs of the first and second electrodes to create a first electric field moving inside the reservoir about the collection zone, said first electric field moving the dispersed phase to the collection zone; and means for applying a second electric field to the dispersed phase in the collection zone, said second electric field causing the dispersed phase to coalesce into a second continuous phase on the first surface of the first wall.

2. A device according to claim 1, in which the plurality of first electrodes includes longitudinal electrodes parallel to each other and passing through the emulsion reservoir.

3. A device according to claim 1, in which at least one of the first or second walls has been subject to a surface treatment at the collection zone.

4. A device according to claim 1, in which the reservoir has a second surface on the second wall and the at least one second electrode defines a surface comprising the second surface.

5. A device according to claim 4, in which the at least one second electrode comprises a single second electrode.

6. A device according to claim 1, in which the reservoir is delimited by sidewalls between the first and second walls.

7. A device according to claim 6, in which at least one sidewall comprises guide means opening up into the collection zone.

8. A device according to claim 1, in which one of the walls of the reservoir comprises means for injecting the continuous phase of the emulsion into the reservoir or ejecting the continuous phase from the reservoir.

9. A device according to claim 1, further comprising analysis means at the collection zone.

10. A device according to claim 1, further comprising means for circulating the dispersed phase, and located in the collection zone.

11. A device according to claim 1, in which the means for activating the pairs of electrodes are adapted to activate the electrodes such that the first electric field is perpendicular to the first wall.

12. A device according to claim 1, in which the means for activating the pairs of electrodes are adapted to create the first electric field moving perpendicular to a direction defined by the collection zone.

13. The separation device according to claim 1, further comprising:

an input channel into the emulsion reservoir; and
a guide member coupled to the collection zone.

14. The separation device according to claim 13, further comprising:

an optical fiber disposed inside the guide member.

15. The separation device according to claim 13, further comprising:

a capillary disposed inside the guide member.

16. A method comprising:

separating an emulsion containing a dispersed phase in a first continuous liquid phase, said emulsion being contained in a reservoir, wherein the separating includes scanning the reservoir by first electric field that moves the dispersed phase to a collection zone including porous walls delimiting sides thereof; and applying a second electric field to the dispersed phase in the collection zone, said second electric field causing the dispersed phase to coalesce into a second continuous phase.

17. A method according to claim 16, in which the reservoir comprises first and second electrodes located on two opposite walls of the reservoir, the first electric field being created by selective activation of pairs of the first and second electrodes.

18. A method according to claim 17, in which pairs of electrodes are side by side and parallel to a direction of the collection zone, between a remote pair of electrodes and a pair of electrodes close to the collection zone, and in which scanning comprises displacement of the first electric field through a sequence of:

applying a first voltage between a first pair of electrodes, eliminating the first voltage, and applying a second voltage between a second pair of electrodes adjacent to the first pair of electrodes in the direction towards the collection zone.

19. A method according to claim 18, in which displacement of the electric field between the pair of electrodes close to the collection zone and the remote pair of electrodes is repeated.

20. A method according to claim 16, further comprising recovering the dispersed phase after its coalescence.

21. The method according to claim 16, further comprising:

disposing a first capillary on a first side of the collection zone;

disposing a second capillary on a second side of the collection zone, opposite the first capillary; and applying pressure through the first capillary that pushes the second continuous phase into the second capillary.

22. The method according to claim 16, wherein the second electric field applies pressure on the dispersed phase in the collection zone until an interface film between drops of the dispersed phase escapes.

23. A separation device for an emulsion containing a dispersed phase dispersed in a first continuous phase, comprising:

an emulsion reservoir delimited between a first wall and a second wall facing the first wall, the reservoir having a first surface on the first wall;

a plurality of first electrodes, fixed to the first wall at the first surface of the emulsion reservoir;

at least one second electrode fixed to the second wall;

a collection zone included in the reservoir, delimited by parts of the first wall and the second wall that are included in the surfaces defined by the plurality of first electrodes and the at least one second electrode respectively, wherein the collection zone is coated so as to enhance wetting properties of the collection zone with respect to the dispersed phase;

means for selectively activating pairs of the first and second electrodes to create a first electric field moving inside the reservoir about the collection zone, said first electric field moving the dispersed phase to the collection zone; and means for applying a second electric field to the dispersed phase in the collection zone, said second electric field causing the dispersed phase to coalesce into a second continuous phase on the first surface of the first wall.

24. A method comprising:
separating an emulsion containing a dispersed phase in a first continuous liquid phase, said emulsion being contained in a reservoir, wherein the separating includes
scanning the reservoir by first electric field that moves the dispersed phase to a collection zone, the collection zone being coated so as to enhance wetting properties of the collection zone with respect to the dispersed phase; and
applying a second electric field to the dispersed phase in the collection zone, said second electric field causing the dispersed phase to coalesce into a second continuous phase.

* * * * *